Oct. 27, 1953  H. DOTSON  2,656,767
TWO-WAY PLOW ATTACHMENT
Filed Nov. 28, 1950  2 Sheets-Sheet 1

Inventor
Homer Dotson
Pierce, Scheffler & Parker
Attorneys

Oct. 27, 1953 — H. DOTSON — 2,656,767
TWO-WAY PLOW ATTACHMENT
Filed Nov. 28, 1950 — 2 Sheets-Sheet 2
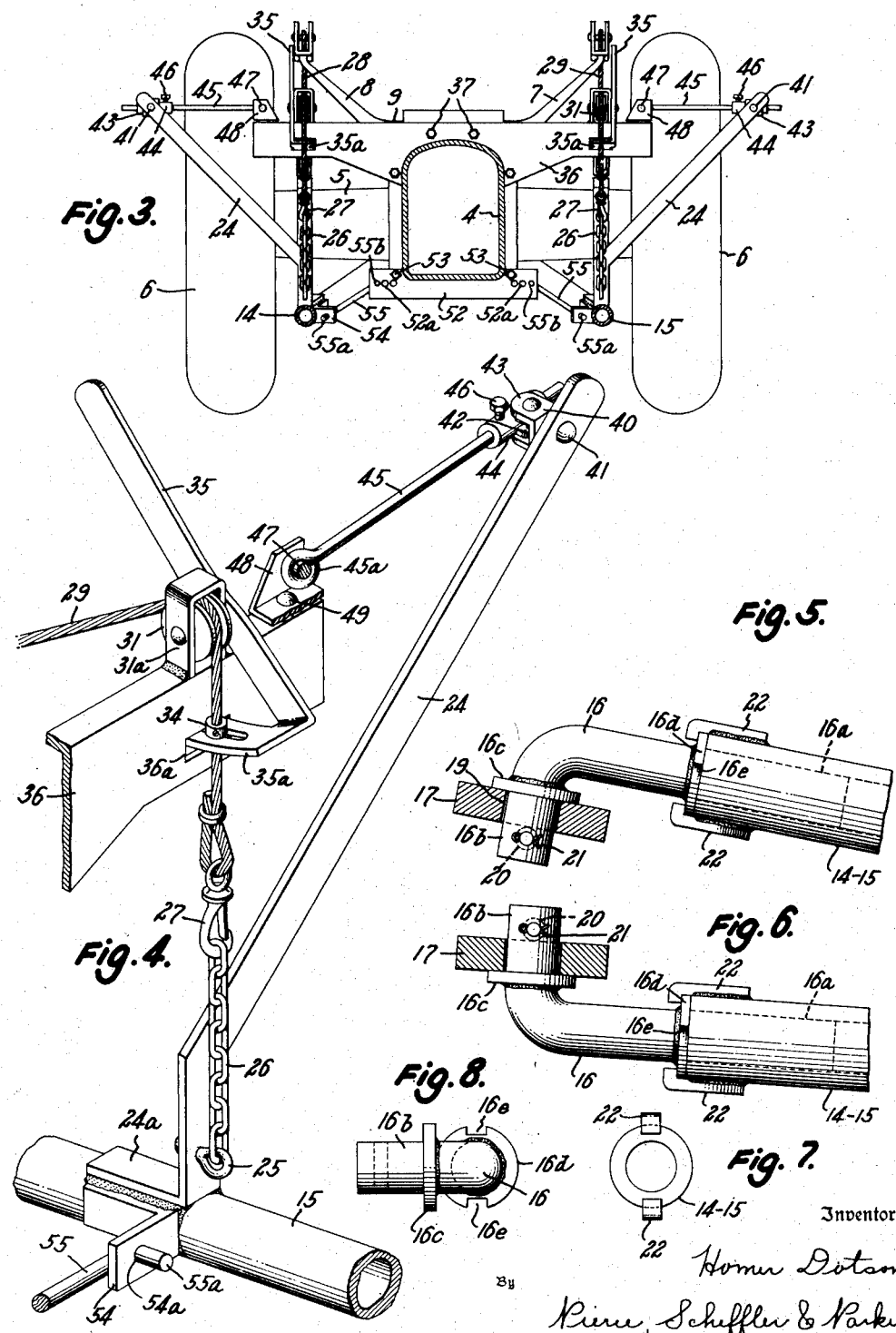
Inventor
Homer Dotson
By Pierce, Scheffler & Parker
Attorneys

UNITED STATES PATENT OFFICE 2,656,767

TWO-WAY PLOW ATTACHMENT

Homer Dotson, Ringling, Okla.

Application November 28, 1950, Serial No. 197,944

5 Claims. (Cl. 97—29)

The present invention relates to a farm implement attachment for tractors and in particular to a dual plow attachment useful in terrace plowing for tractors of the well known Ford or Ferguson type which are provided with a power actuated lifting device.

An object of the invention is to provide an attachment of the class described which can be manufactured at low cost, is simple and rugged, reliable in operation, and which can be installed or removed quickly.

Another object is to provide a dual or two-way plow attachment for tractors that includes means for adjusting the bite, pitch and ground angle of the plows to the end that the plows may be set up in various ways to suit various conditions of earth to be worked.

Yet another object is to provide an improved arrangement for hanging the dual plows of a two-way terracing plow attachment in such manner that both can be raised or lowered by the power lift unit on the tractor; also one can be retained in the raised or transport position while the other occupies its lower or ground working position, and vice versa to the end that the operator of the tractor can plow in both directions across the field merely by turning the tractor around when one end of the field is reached and switching from the plow on one side of the machine to the plow on the other side.

The foregoing as well as other objects and advantages inherent in the invention will become more apparent from the following detailed description and accompanying drawings which illustrate one structural embodiment of the invention as installed on the tractor.

In the drawings:

Fig. 3 is a transverse section taken on line 3—3 of Fig. 1 looking rearward;

Fig. 4 is an enlarged detail view in perspective of the latching and pitch adjustment mechanism; and Figs. 5–8 are enlarged fragmentary views showing structural detail at the rear of the plow beam.

Figure 1:
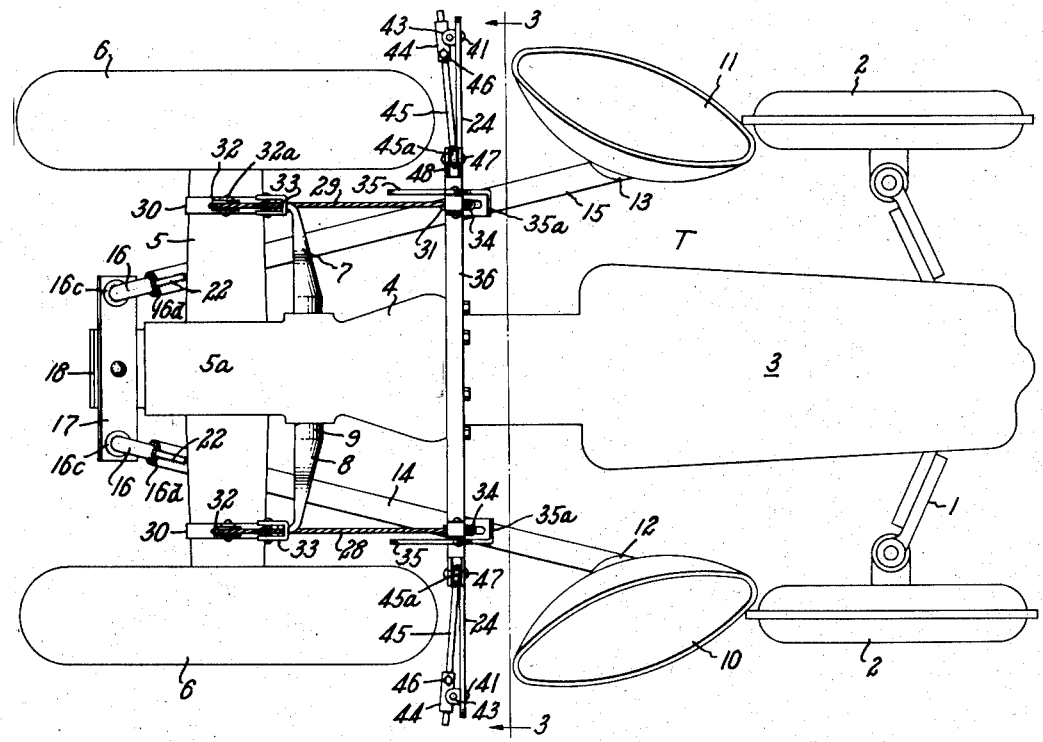
Fig. 1 is a top plan view of the tractor with the two-way plow attachment.

Referring now to the drawings, the tractor, designated by the general reference character T, on which the invention is shown installed is of the well known Ford or Ferguson type. However, in the interest of simplifying the drawings most of the tractor components non-essential to the invention have been omitted. Those components of the tractor that have been illustrated include the conventional front axle 1 and wheels 2, motor 3, transmission housing 4, rear axle and housing 5, rear wheels 6, and a pair of hydraulically actuated lifting arms 7, 8, the arms being secured at the outer ends of a transverse shaft 9 which is power driven to bring the arms from a substantially horizontal position to the position shown in the drawings. A hydraulic ram is customarily used for driving the shaft 9 in rotation and a typical arrangement can be found in U. S. Patent No. 2,118,180. The details of the ram and its hydraulic controls have not however been shown in the present application since its inclusion is not considered essential to an understanding of the present invention.

Intermediate the front and rear axles of the tractor are located right and left hand disc plows 10, 11. These are disposed on opposite sides of the longitudinal axis of the tractor, facing generally forward and outwardly. The plows 10 and 11 are journalled for rotation in sockets 12, 13 carried respectively at the forward ends of plow beams 14, 15 made of steel tubing. The plow beams extend from a support located at the rear axle of the tractor forward and outward in a diverging V. The disc plows 10 and 11 are set with their respective axes canted at a slight angle to the longitudinal axes of their respective beams, and the pitch of the plows, i. e. the angle of entry can be adjusted by rotating the plow beams about their longitudinal axes in a manner to be more fully explained.

As seen particularly well in Figs. 1 and 5–8, the rear end of each plow beam terminates in an elbow support 16. The forward end 16a of each elbow is of such a diameter as to make a snug, sliding fit in the bore of the tubular plow beam in which it is inserted, and the rear part 16b of each elbow is adapted to enter and be held at the outer end of a substantially horizontal, transversely extending support plate 17 secured to a platform 18 that constitutes a rearward extension at the lower part of the tractor's rear axle housing 5a.

As shown in Fig. 5, the rear portion 16b of the connecting elbow 16, pointing downward, is inserted from the top through a hole 19 in the outer end of support 17 and rests with the flange 16c on the elbow in contact with the upper face of plate 17. A locking pin 20 passed through an aperture at the end of the elbow and retained by a cotter pin 21, secures the elbow against accidental dislodgement. In this position the longitudinal axis of the plow beam 14, 15 has a substantial downward dip forward in the vertical plane which gives the disc plows 10, 11 a marked downward as well as forward thrust which is the most efficient for plowing soft earth.

Fig. 6 shows the alternative manner for connecting up the rear end of the plow beam wherein the elbow end 16b is inserted from the bottom upwardly through the hole 19 in support plate 17. This mode of connection obviously decreases the angle of repose of the plow beam thus correspondingly decreasing the downward thrust of the plows and is the position deemed most efficient for plowing hard or clay-like soils. The elbow connection at the rear of each plow beam also permits the beams to be swung in a horizontal plane to adjust the bite of the plows. This adjustment will be explained later in further detail.

Figure 2:
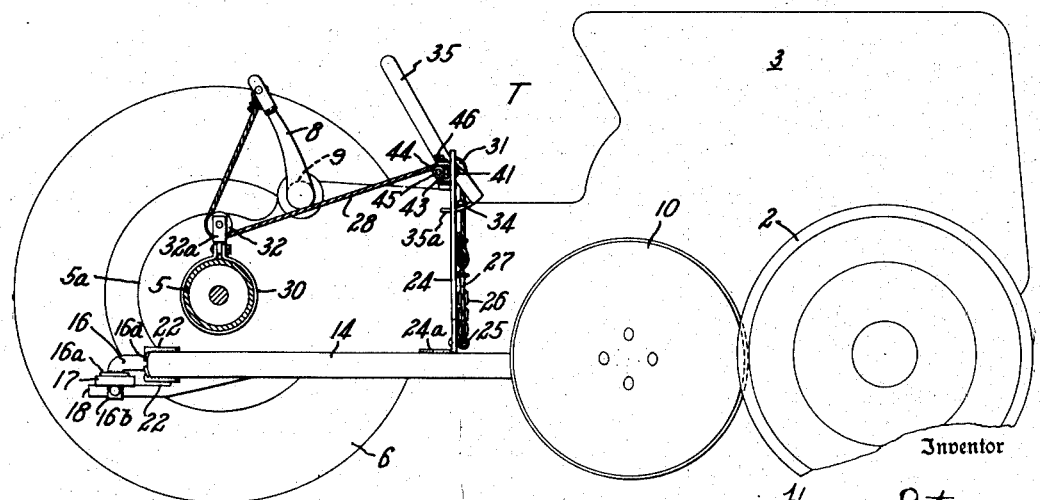
Fig. 2 is a view in side elevation of the tractor and plows with certain parts broken away.

With reference now in particular to Figs. 2-4, it will be seen that each of the plow beams 14, 15 has a strut 24 secured to it intermediate the ends of the beam. The lower end 24a of each strut 24 lies parallel with and is secured to the beam such as by welding, and the strut projects upward and angularly outward from this anchor point. An eye bolt 25 is anchored to the lower end of each strut 24. Extending upwardly from each of the eye bolts 25 is a short length of chain 26 and the upper end of each chain is fastened to a snap hook 27. The hooks 27 are secured to cables 28, 29 which pass over front and rear pulleys 31, 32 to clevis type anchors 33 at the outer ends of the lifting arms 7, 8. The frames 32a in which the rear pulleys are journalled are carried by bands 39 which are adapted to be clamped around the rear axle housing 5a of the tractor. Thus as the power actuated lifting arms 7, 8 are raised by rotation (clockwise as viewed in Fig. 2) each plow beam 14, 15 will be lifted about a pivot located at the connecting elbow 16, the holes 19 in plate 17 being larger than the elbow end 16b to permit the necessary swinging movements in the vertical plane. Lowering of the lifting arms 7, 8 will, in like manner, cause the plow beams to lower themselves by gravity.

The conventional arrangement for the ram actuated lifting arms 7, 8 permits them to be held at any angle intermediate their fully lowered or fully raised positions. This enables the plow beams 14, 15 and hence the plows 10, 11 to be held high above the contact plane between the ground and tractor wheels for road clearance in transport, and also enables one to adjust the ground working level or "draft" of the plows.

At the outset, it was explained that provision is made for latching either or both plow beams in the transport position. To this end it will be observed from Fig. 4 that each of the lifting cables 28, 29 is provided with a set screw attached stop collar 34 which is adapted to cooperate with the forked portion 35a of a manually operated latching lever 35. This lever is pivotally mounted intermediate its ends on the shaft of the forward cable pulley 31 so that when rotated, the forked end 35a may be brought to underlie collar 34 and hence maintain the plow beam in the elevated, transport position irrespective of any movement of the power actuated lifting arms. The frames 31a for the forward cable pulleys 31 are welded to a transverse yoke 36 that rests upon the top of the transmission housing 4 and is secured thereto by bolts 37, and the yoke 36 is provided with slots 36a to pass the forked portion 35a of each latch lever 35.

When both plow beams are latched in the transport position, the position shown in Fig. 4, the cable connections at the clevises 33 may be detached thus leaving the lifting arms 7—8 free for other applications where power is required. Moreover, when the double plows are used for contour plowing, the selective latching arrangement permits one of the plow beams to be latched in the transport position while the other is in its lowered, working position when plowing in one direction, and vice versa when plowing in the other direction.

The invention also provides for adjusting the pitch of each plow which requires that each of the tubular plow beams 14, 15 be capable of rotation about its longitudinal axis. To this end, it will be seen that the rear end of each beam is provided with a pair of diametrally disposed lugs 22 cooperative with a flange 16d secured on the shank of elbow 16 and which has diametrally disposed slots 16e. When inserting the forward end of elbow 16 into the bore of the plow beam, the slots 16e are aligned with lugs 22 and consequently the flange 16d will be free to pass beyond the lugs 22. Elbow 16 is then given a quarter turn from the position shown in Fig. 8 to the position of Figs. 5 or 6 thus locking the flange 16d behind the lugs 22 to retain the elbow in the bore of the plow beam and permitting rotation of the plow beam in either direction throughout the full range of pitch adjustment without uncoupling the elbow from the beam.

For securing the plows at the desired pitch, it will be noted from Fig. 4 in particular that at the outer end of each of the struts 24 I have provided a clevis 40 which is pivotally secured to the strut by a horizontal pin 41. The clevis 40 is in turn pivotally connected to another clevis 42 by a connecting pin 43 disposed perpendicularly to pin 41. Secured rigidly to clevis 42 is a sleeve 44 slidable along a bar 45 extending outboard from the tractor, and the sleeve 44 is adapted to be clamped at any desired position along the bar by means of a set screw 46. The inner end of each bar 45 terminates in an eye 45a which is fastened by a horizontal pin 47 to another clevis 48, the latter being secured to the upper face of yoke 36 by a vertical pivot pin 49.

When the sleeve 44 is moved inwardly along bar 45 towards the outer end of the transverse supporting yoke 36, the plow beam will be rotated in such direction as to decrease the pitch of the canted plow. Conversely when sleeve 44 is moved outwardly along bar 45, the pitch of the canted plow will be increased.

The invention also provides for adjusting the bite of the plows thereby effecting an adjustment in the width of the furrow being plowed. Fig. 3 shows the preferred arrangement quite clearly wherein a plate 52 having a plurality of horizontally spaced holes 52a at each end thereof is secured by bolts 53 to the underside of the transmission housing 4. Each of the plow beams 14, 15 has secured to it an angle plate 54 containing a hole 54a. The outer bent end 55a of a rigid tie rod 55 is put through hole 54a, and the inner bent end 55b of rod 55 is put through one of the holes 52a at the end of plate 52 depending upon the extent of the bite desired. If as pictured in Fig. 3 the outermost one of the holes 52a is used, the forward end of the plow beam occupies its outermost position as measured horizontally in the direction away from the longitudinal axis of the tractor and hence because of the cant of the plow the bite will be comparatively narrow, for example producing a furrow ten inches in width. When in the middle of the holes 52a, the plowed furrow will for example be fourteen inches wide, and when in the innermost of the holes 52a, eighteen inches. Other types of couplings such as a threaded rod and nut arrangement could be used for changing the effective length of the tie rod connection between the tractor and the plow beam, or a plurality of spaced holes could be provided in the angle plate 54.

Because of their rigidity the tie rods 55 also prevent any lateral displacement of the plow beams 14, 15 while plowing. The pivotal nature of the connections at the ends of the rod 55 in conjunction with the double pivot, universal type connections at the opposite ends of the bars 45 allow the necessary movement of the plow beams 14, 15 incident to adjustment of the pitch of plows 10, 11 by rotational adjustment of the beams and also allow the beams to be raised and lowered without disturbing the pitch adjustment.

In conclusion it should be evident that the two way plow attachment that has been described offers many advantages. Installation or removal of the implement is simple, quick and requires no modification of the tractor. The holes in the yoke 36 and lower plate 52 by which these members are attached to the tractor may be suited in size and spacing to bolts already existing in the transmission housing of the Ford or Ferguson tractor, the bands holding the rear pulleys are simple to install on the rear axle housing and the rear plate 17 forming the support for the rear ends of the plow beams is attached simply to the tractor by a bolt connection.

Moreover, the three principal types of plow adjustment afforded by the invention, namely, adjustment of the height at which the rear ends of the plow beams are supported to thereby adjust the angle of dip of the plow beams and hence the angle of thrust of the plows into the earth, rotation of the beams about their horizontal axes to change the pitch of the plows, and lateral adjustment of the beams in the horizontal plane by changing the effective length of the tie rods 55 to thereby effect a change in the bite of the plows are sufficient to enable the attachment to be adapted to cope with all types of ground to be worked.

In conclusion, I wish it to be understood that the illustrated construction of the various components are to be considered typical rather than limitative and hence may be departed from in minor detail without however departing from the spirit and scope of the invention as defined in the appended claims.

I claim:

1. In a dual terracing plow attachment for a tractor having a power operated lift device, the combination comprising a pair of plow beams extending generally forward and outward from the rear of the tractor on opposite sides of the longitudinal axis of the tractor, a disc plow at the forward end of each beam, a connecting elbow at the rear end of each beam, and a support plate adapted to be secured to the rear end of said tractor in a substantially horizontal position, said plate having spaced apertures therethrough for receiving the elbows at the ends of said plow beams to form pivotal connections therefor, said elbows being insertable into said apertures alternatively from the underside or from the upper side of said support plate to adjust the height of the rear pivotal connection for said beams, and cable means extending from each said beam intermediate the ends thereof to the power operated lift on said tractor for raising or lowering the plows at the forward ends of said beams.

2. In a dual terracing plow attachment for a tractor having a power operated lift device, the combination comprising, a yoke extending transversely of and adapted to be secured to the upper side of the tractor body forwardly of said lift device, a pair of plow beams extending generally forward and outward from the rear of the tractor on opposite sides of the longitudinal axis of the tractor, a disc plow at the forward end of each beam, means for pivotally supporting the rear end of each beam on said tractor for swinging movement in a vertical plane, a cable extending from each beam intermediate the ends thereof to a point of attachment on said lift device for elevating said beams upon operation of said lift device, and independently operable cable latch devices individual to each said cable and carried by said yoke for selectively holding said beams in the elevated position.

3. A dual terracing plow attachment for a tractor as defined in claim 2 wherein each said cable latching device is constituted by a pivoted lever having a forked portion adapted to engage a stop collar carried by the cable.

4. In a dual terracing plow attachment for a tractor having a power operated lift device, the combination comprising, a yoke extending transversely of and adapted to be secured to the tractor forwardly of said lift device, a pair of plow beams extending generally forward and outward from the rear of the tractor below said yoke on opposite sides of the longitudinal axis of the tractor, a disc plow at the forward end of each beam, means for pivotally supporting the rear end of each beam on said tractor for swinging movement in a general vertical plane, a cable extending from each beam intermediate the end thereof to a point of attachment on said lift device for elevating said beams upon operation of said lift device, and independently controlled cable latch devices individual to each said cable and carried by said yoke for selectively holding said beams in the elevated position.

5. In a dual terracing plow attachment for a tractor having a power operated lift device, the combination comprising a pair of plow beams extending generally forward and outward from the rear of the tractor on opposite sides of the longitudinal axis of the tractor, a disc plow at the forward end of each beam, means for pivotally supporting the rear end of each beam on said tractor for swinging movement in a vertical plane, a yoke extending transversely of and adapted to be secured to the upper side of the tractor body forwardly of said lift device, a pair of pulleys fixed in spaced relation on said yoke, a pair of latching levers fixed on said yoke, a second pair of pulleys and band means for clamping the same in spaced relation around the rear axle housing of said tractor, a cable extending from each beam intermediate the ends thereof over said pulleys to a point of attachment on said lift device for elevating said beams upon operation of said lift device, and independently operable cable latching devices individual to each said cable and carried by said yoke for selectively holding said beams in the elevated position.

HOMER DOTSON.

References Cited in the file of this patent

UNITED STATES PATENTS

| Number | Name | Date |
| --- | --- | --- |
| 1,456,817 | Morton | May 29, 1923 |
| 1,774,008 | Hester | Aug. 26, 1930 |
| 2,425,806 | Ing | Aug. 19, 1947 |